(12) United States Patent
Schneider

(10) Patent No.: US 11,312,826 B2
(45) Date of Patent: Apr. 26, 2022

(54) HOT-MELT ADHESIVE AND USE THEREOF

(71) Applicants: IP & Patent Management UG (haftungsbeschränkt), Bremen (DE); KHS GmbH, Dortmund (DE)

(72) Inventor: Jörg Schneider, Bremen (DE)

(73) Assignee: KHS GMBH, Dortmund (DE)

( * ) Notice: Subject to any disclaimer, the term of this patent is extended or adjusted under 35 U.S.C. 154(b) by 150 days.

(21) Appl. No.: 14/905,023

(22) PCT Filed: Jul. 16, 2014

(86) PCT No.: PCT/EP2014/065272
§ 371 (c)(1),
(2) Date: Jan. 14, 2016

(87) PCT Pub. No.: WO2015/007785
PCT Pub. Date: Jan. 22, 2015

(65) Prior Publication Data
US 2016/0137793 A1    May 19, 2016

(30) Foreign Application Priority Data
Jul. 16, 2013 (EP) ...................... 13176743

(51) Int. Cl.
| | | |
|---|---|---|
| *B29C 65/48* | (2006.01) | |
| *C08J 5/12* | (2006.01) | |
| *C09J 153/02* | (2006.01) | |
| *C09J 133/08* | (2006.01) | |
| *B29L 31/00* | (2006.01) | |

(52) U.S. Cl.
CPC ........... *C08J 5/128* (2013.01); *B29C 65/4815* (2013.01); *C09J 133/08* (2013.01); *C09J 153/02* (2013.01); *C09J 153/025* (2013.01); *B29L 2031/7158* (2013.01); *C08J 2367/02* (2013.01); *C08J 2423/08* (2013.01); *C08J 2453/02* (2013.01)

(58) Field of Classification Search
CPC .... C09J 153/02; C09J 153/00; C09J 153/025; C08L 2666/02; C08J 5/128; C08J 2367/02; C08J 2423/08; C08J 2453/02; C08J 5/124; B29C 65/4815; B29L 2031/7158; B29L 2031/7162; B29L 2031/7166; B29L 2031/7142; B65D 21/0205
USPC ........ 524/505; 42/34.1, 35.7; 428/34.1, 35.7
See application file for complete search history.

(56) References Cited

U.S. PATENT DOCUMENTS

| | | | | |
|---|---|---|---|---|
| 5,331,038 A | * | 7/1994 | Dillman | ............... C09J 151/006 524/271 |
| 5,916,959 A | | 6/1999 | Lindquist et al. | |
| 2007/0249781 A1 | | 10/2007 | De Keyzer et al. | |
| 2008/0306214 A1 | | 12/2008 | Kanderski | |
| 2009/0232764 A1 | * | 9/2009 | Ober | ......................... C08F 8/00 424/78.09 |
| 2010/0249313 A1 | * | 9/2010 | Okazaki | ................. C09J 153/02 524/505 |
| 2011/0288208 A1 | * | 11/2011 | Nakatani | ................ C09J 123/10 524/77 |
| 2013/0165568 A1 | * | 6/2013 | Goubard | ................ C09J 125/16 524/210 |

FOREIGN PATENT DOCUMENTS

| | | |
|---|---|---|
| EP | 0 798 358 A1 | 10/1997 |
| EP | 1 241 239 A1 | 9/2002 |
| EP | 1 566 423 A1 | 8/2005 |

OTHER PUBLICATIONS

International Search Report PCT/EP2014/065272 dated Jan. 20, 2015.

* cited by examiner

*Primary Examiner* — Lee E Sanderson
(74) *Attorney, Agent, or Firm* — Renner, Kenner; Arthur M. Reginelli

(57) ABSTRACT

The present invention relates to the use of a hot-melt adhesive for adhesive bonding of at least a first packaging and a second packaging, the hot-melt adhesive comprising: (a) 7-48 parts per weight of a polymer component, the polymer component comprising a styrene block copolymer; (b) 15-52 parts per weight of a tackifying component, wherein the tackifying component comprises thermoplastic adhesive resin, aliphatic hydrocarbon, cycloaliphatic hydrocarbon, aromatic hydrocarbon, the respective hydrocarbon optionally being modified and/or hydrogenated, terpenes, the terpenes optionally being modified or hydrogenated, rosins, the rosins optionally being modified or hydrogenated, or mixtures thereof; (c) 5-25 parts per weight of a plasticizer component, wherein the plasticizer component comprises paraffinic oils, naphthenic oils, polybuten, polybutadien, dibasic esters, polyols or mixtures thereof; and d) 0.02-1.2 parts per weight of a stabilizer component, wherein the stabilizer component is a light stabilizer, preferably as a sterically hindered phenolic antioxidant and/or a sterically hindered amine, most preferably is pentaerythritol tetrakis (3-(3,5-di-tert-butyl-4-hydroxyphenyl)propionate).

14 Claims, No Drawings

HOT-MELT ADHESIVE AND USE THEREOF

The present invention relates to the use of a hot-melt adhesive for adhesive bonding of packaging and a pack comprising the hot-melt adhesive.

Traditionally the formation of multiple containers for beverages or food to form a pack of various items (in the following abbreviated in "pack" or "multipack") has only been possible by the employment of a shrink sleeve film, cardboard outer wrap or a mechanical locking/holding arrangement.

There are inherent problems with the shrink sleeve multipack arrangement in that the individual containers are difficult to remove. Often sharp tools are used to open the secondary packaging with the result that without purpose the product containers are damaged. The cardboard overwrap can also be problematic as the construction can be unstable, particularly with heavier shaped containers.

Both methods (shrink sleeve and cardboard) or other secondary packaging involve the use of packaging materials in addition to the beverage or food container, leading to higher levels of packaging waste.

Hot-melt adhesives are widely used for various commercial and industrial applications such as product assembly and packaging. Such hot-melt adhesives are applied to a substrate while in its molten state and cooled to harden the adhesive layer.

Current commercial hot-melt adhesive formulations do not provide the necessary performance characteristics necessary for application.

To fulfil this function, the adhesive must display a very high level of cohesive strength, heat resistance and provide good levels of adhesion to the container in transit and storage in a wide variety of ambient conditions. But when the multipack reaches the consumer, the individual containers have to be relatively easy to be separated allowing individual consumption of the contents of the containers.

An adhesive mixture has to have sufficient adhesion to the substrates to hold the containers together in a broad range of ambient conditions, including high and low temperatures, high and low humidity and environments with high UV exposure. The adhesive mixture must also have sufficient flexibility to allow expansion in the adhesive joint as the container expands and contracts during its exposure to the different prevailing environmental conditions.

The adhesive must be able to be applied easily in a high speed automated process, concurrent with a modern high speed beverage or food filling or processing line/machine.

Therefore, it is an object of the present invention to provide adhesive mixtures for adhering packagings, for example containers, such as PET-bottles, cans or glass bottles having sufficient durability and adhesion to hold the container together until the consumer desires separation.

Further, a hot-melt adhesive mixture for use in the temporary bonding, attachment and collation of multiple containers, preferably for beverages or food, to form a pack of various items in an automated application process, without the use of secondary/external packaging, over-coming drawbacks of the prior art shall be provided.

The purpose of this invention is further to provide the multipack arrangement (pack) but greatly reducing the amount of packaging material used in the formation.

The object has been achieved by use of a hot-melt adhesive for adhesive bonding of at least a first packaging and a second packaging, the hot-melt adhesive comprising: (a) 7-48 parts per weight of a polymer component, the polymer component comprising a styrene block copolymer; (b) 15-52 parts per weight of a tackifying component, wherein the tackifying component comprises thermoplastic adhesive resin, aliphatic hydrocarbon, cycloaliphatic hydrocarbon, aromatic hydrocarbon, the respective hydrocarbon optionally being modified and/or hydrogenated, terpenes optionally being modified or hydrogenated, rosins, the rosins optionally being modified or hydrogenated, or mixtures thereof; (c) 5-25 parts per weight of a plasticizer component, wherein the plasticizer component comprises paraffinic oils, naphthenic oils, polybuten, polybutadien, dibasic esters, polyols or mixtures thereof; and (d) 0.02-1.2 parts per weight of a stabilizer component, wherein the stabilizer component is a light stabilizer, preferably as a sterically hindered phenolic antioxidant and/or a sterically hindered amine, most preferably is pentaerythritol tetrakis (3-(3,5-di-tert-butyl-4-hydroxyphenyl)propionate).

Preferably, the polymer component is comprised in the hot-melt adhesive in an amount of at least 10 parts per weight, preferably 15 parts per weight, preferably 20 parts per weight, preferably 25 parts per weight, preferably 30 parts per weight, preferably 35 parts per weight, preferably 40 parts per weight, preferably 45 parts per weight.

Preferably, the polymer component is comprised in the hot-melt adhesive in an amount of not more than 45 parts per weight, preferably 40 parts per weight, preferably 35 parts per weight, preferably 30 parts per weight, preferably 25 parts per weight, preferably 20 parts per weight, preferably 15 parts per weight, preferably 10 parts per weight.

Preferably the tackifying component is comprised in the hot-melt adhesive in an amount of at least 20 parts per weight, preferably 25 parts per weight, preferably 30 parts per weight, preferably 35 parts per weight, preferably 40 parts per weight, preferably 45 parts per weight.

Preferably, the tackifying component is comprised in the hot-melt adhesive in an amount of not more than 50 parts per weight, preferably 45 parts per weight, preferably 40 parts per weight, preferably 35 parts per weight, preferably 30 parts per weight, preferably 25 parts per weight, preferably 20 parts per weight.

Preferably, the plasticizer component is comprised in the hot-melt adhesive in an amount of at least 10 parts per weight, preferably 15 parts per weight, preferably 20 parts per weight.

Preferably, the plasticizer component is comprised in the hot-melt adhesive in an amount of not more than 20 parts per weight, preferably 15 parts per weight, preferably 10 parts per weight.

Preferably, the stabilizer component is comprised in the hot-melt adhesive in an amount of at least 0.2 parts per weight, preferably 0.4 parts per weight, preferably 0.6 parts per weight, preferably 0.8 parts per weight, preferably 1.0 parts per weight.

Preferably, the stabilizer component is comprised in the hot-melt adhesive in an amount of not more than 1.0 parts per weight, preferably 0.8 parts per weight, preferably 0.6 parts per weight, preferably 0.4 parts per weight, preferably 0.2 parts per weight.

A hot-melt adhesive in terms of the present invention shall be understood as a form of thermoplastic adhesive. Hot-melt adhesives are also known in the art as hot glues. A hot-melt adhesive is solid at room temperature and is melted to then being applied to the surface to be adhered. By cooling the melted hot-melt adhesive, strong adhesive bonding is achieved.

Adhesive bonding in terms of the present invention is applying to an intermediate layer to connect substrates of different materials. In the inventive use, the intermediate layer is formed by the hot-melt adhesive. The connected substrates are the packagings to be connected.

The inventive use relates to adhesive bonding of at least two packagings. However, the inventive use relates also to adhesive bonding of more than two packagings. In this embodiment, each packaging is connected to at least another packaging by adhesive bonding using the hot-melt adhesive as defined in the inventive use.

In general, any packaging can be applied in the inventive use. Packaging shall be understood as a material used for enclosing or protecting products for distribution, storage, sale, and use.

Preferably, the packaging is a foodstuff packaging, preferably a foodstuff container, more preferably a bottle or can, most preferably a plastic bottle.

In the preferred embodiment, wherein the packaging is a bottle, the term bottle shall be understood broadly and encompass PET-bottles, glass-bottles, cans etc.

A copolymer shall be understood as polymers comprising two or more different monomer units.

Preferably, the polymer component further comprises ethylene-butyl-acrylate/vinyl-acetate copolymer, catalysed elastomers or mixtures thereof.

A block-copolymer is a special kind of copolymer made of blocks of different polymerized monomers.

Further preferred, the styrene block copolymer is polystyrene-block-polyolefin, preferably is polystyrene-block-poly(ethylene-RAN-butylene)-block-polystyrene, with RAN meaning random distribution of ethylene and butylene, or polystyrene-block-polybutadiene-block-polystyrene, optionally hydrogenated.

"Modified" in terms of the present invention shall be understood in a way that a substance is modified if it is chemically altered in a way that the original characteristics of the substance are not essentially influenced. For example, modified can be modified by minor changes in the substitution pattern of the modified compound.

Thermoplastics in terms of the present invention are polymers which become pliable or moldable above a specific temperature and which return to a solid state upon cooling.

A dibasic ester in terms of the present invention is an ester of a dicarboxylic acid.

A plasticizer in terms of the present invention shall be understood as an additive increasing the plasticity of fluidity of a material.

In general, stabilizers, are compounds which prevent, when being comprised in a polymer, various effects, such as oxidation, chain scission, uncontrolled recombinations and cross-linking reactions that are caused by, for example, photo-oxidation of polymers. Light stabilizers are, therefore, to be understood as compounds to be used to avoid effects coming along when being exposed to electromagnetic radiation, particularly light.

The problem has further been solved by a pack, preferably a multipack, essentially comprising at least two packagings and a hot-melt adhesive; wherein each packaging is connected to at least one other packaging by adhesive bonding, the adhesive bonding being made by the hot-melt adhesive, and the hot-melt adhesive being the hot-melt adhesive as defined for the inventive use.

The inventive pack is essentially comprised of two or more packagings being adhered together by using the hot-melt adhesive as defined herein. Essentially comprising shall be understood that no other means to build a multipack arrangement of the packaging, such as shrink sleeve or cardboard overwrap, are necessary. Nevertheless, presence of such materials for decoration purpose or the like is not excluded. Just as little other decoration elements, brands, labels or technical means for solving another problem etc. are excluded.

Preferably, the packaging in the pack is a foodstuff packaging, preferably a foodstuff container, more preferably a bottle.

The problem has further been solved by the hot-melt adhesive resultant from mixing the above ingredients a, b, c and d together having a density of between 0.790-1.2 g/cm$^3$, a melt flow index of 15-4000 g/min (1 kg at 200° C.), a viscosity of 160° C. between 200 and 11,000, preferably 10,000 cPs, measured by using a Brookfield RVT visometer, spindle SC-4-27, according to ASTM D3236 (1999), a Shore hardness in the range of 15 and 70 A at 23° C. according to ASTM D2240, and a softening point determined by ASTM E28 above 40° C. and not greater than 158° C.

Preferably, the hot-melt adhesive compound is obtainable from an inventive hot-melt adhesive mixture the mixture comprising ingredients and as defined above. More preferably, the hot-melt adhesive is obtainable by blending.

Most preferably, the inventive hot-melt adhesive mixture and/or the inventive hot-melt adhesive have a relatively flat elastic modulus from −20° C. to 50° C., extremely good heat stability, Tg of about −32° C., fogging temperature above 100° C., low volatiles content over 0.10% after two hours at 110° C., viscositiy at 160° C. of about 700-4000 mPas or mixtures thereof.

In terms of the present invention, an extremely good heat stability of the inventive hot-melt adhesive mixture is provided when the adhesive has an oxidation reduction time, determined by ASTM E 3895-98 of 12 minutes, preferably 12.28 minutes, or greater at 150° C.

In terms of the present invention, the hot melt mixture has a low volatiles content when having a volatile emission measured in percentage terms of 0.1% or less, according to ASTM E 595-93. In this way, fogging or coating of the substrates with low molecular weight hydrocarbons during the application of the adhesive is avoided.

In a preferred embodiment, the inventive hot-melt adhesive mixture and/or the inventive hot-melt adhesive having a high level of cohesive strength, heat resistance, good adhesion to the preferably beverage and/or food containers in transit and storage in a wide variety of ambient conditions. At the same time, when a multipack (meaning a plurality of packings adhesive bound by means of the hot-melt adhesive) reaches the consumers the hot-melt adhesive specific properties enables the consumers to separate easily the containers allowing individual consumption of the contents of the containers.

A "good adhesion" in terms of the present invention is meant to be an adhesion between the bound packagings allowing secure storage and transport of the bound packagings but also allowing easy separation of the packagings without undue body strength or tools. In particular preferred is an adhesion of 15N/25 mm or less, determined by peel adhesion (180°) or loop tack (23° C.) methods.

The adhesive mixture herein mentioned has been carefully designed and constructed to provide sufficient durability and adhesion to hold the containers together until the consumer desires separation.

The object has also been solved by inventive use of the hot-melt adhesive mixture and/or the hot-melt adhesive, in particular for adhering multiple containers for beverages or food to form a pack of various items in an automated application process, without the use of secondary/external packaging.

In further preferred embodiments, ingredients a to d of the hot-melt adhesive applied in the inventive use may be:

(a) A polymer component comprising of a blend of styrenic block co-polymers including styrene ethylene styrene, styrene ethylene propylene, styrene isoprene styrene (SIS), styrene butylene styrene (SBS), ethylene butyl acrylate/vinyl acetate.

(b) A tackifying component comprising adhesive resins, aliphatic, cycloaliphatic and aromatic hydrocarbons and modified hydrocarbons and hydrogenated versions; terpenes and modified terpenes and hydrogenated versions; rosins and rosin derivatives and hydrogenated versions; and mixtures thereof. These tackifying resins have a ring and ball softening point from 70° C. to 150° C., and will typically have a viscosity at 350° F. (177° C.) as measured using a Brookfield viscometer, of no more than 2000 cPs (20 grams/cm second).

(c) A plasticizer component comprising of Paraffinic or napthenic oils, Polybutene or dibasic esters and/or Polyols.

(d) A stabilizer component comprising a sterically hindered phenolic antioxidant and a sterically hindered amine light stabilizer.

By common knowledge this mixture is referred to as a hot-melt adhesive.

Due to the nature of the application each named component may be comprised of a singular component or a blend of components in order to achieve the desired properties.

Surprisingly it was found that the inventive mixtures and compounds have the advantage of greatly reducing the amount of packaging in a multipack construction while providing a stable multipack which is easily separated by the consumer.

The adhesive blend can be made in a heated mixing vessel of the planetary type, z blade or ribbon type. Heat must be applied to the walls of the vessel evenly to avoid thermal degradation during processing. Processing temperature is in the 100-160° C. range. A vacuum should be applied during the blending process to avoid the incorporation of air. The mixture can also be prepared using a single screw or twin screw extruder with a heated barrel using moderate shear rates.

In very preferred embodiments, the hot-melt mixture for inventive use is achieved from a mixture of:

(a) a polymer component comprising of a blend of A-B-A Hydrogenated Styrene/butadiene co-polymers, a commercially known example of this product is the Kraton G series of polymers, further particularly preferred styrenic block co-polymers are styrene isoprene styrene (SIS), or styrene butylene styrene (SBS);

(b) a tackifying component comprising, preferably consisting of a blend of Polydicyclopentadiene (PDCPD) polymer resin, formed through opening metathesis polymerisation (ROMP) which have a ring and ball softening point from 70 to 150° C., and will typically have a viscosity of 350° F. (177° C.) as measured using a Brookfield viscosimeter, of no more then 3000 centipoise (20 grams/cm second), a commercially known example of this product is Escorez 5000 series;

(c) a plasticizer component comprising of paraffinic oils, a commercially available example of this product is Primol 352; and (d) a stabilizer (end block reinforcing) component comprising of sterically hindered phenolic antioxidant and sterically hindered amine light stabilizer.

By common knowledge this mixture is referred to as a hot-melt adhesive.

The inventive effect may be traced back to interactions of the compounds as described below in detail. However, this rather scientific discussion shall merely be understood to facilitate the understanding of the invention without having any limiting effect on the scope of the invention.

Preferably, the hot-melt adhesive further comprises alpha methyl styrene (AMS).

The use of A-B-A hydrogenated styrene butadiene block copolymer with a hydrogenated midblock in conjunction with the PDCPD and AMS polymers is deemed to provide the desired properties.

The alpha methyl styrene polymer being purely aromatic in nature only has the ability to act upon the styrene domain of the ABA block co-polymers. This effect is greatly enhanced by the fact that this range of block co-polymers has a saturated midblock when compare to a traditional SIS or SBS block copolymer.

This has the effect of increasing the cohesive strength and heat resistance of the adhesive product without affecting the other properties of the adhesive. The PDCPD polymers act with the mid block only of the block copolymer, providing the level of tack and adhesion needed to fulfil the application.

The plasticizer selected acts upon the adhesive to increase the flexibility and reduce the viscosity to a suitable level without reducing the cohesive strength and thermal resistance of the adhesive to undesirable levels.

This invention relates to the use of a hot-melt adhesive mixture for the temporary bonding, attachment and collation of multiple containers for beverages or food to form a pack of various items in an automated application process, without the use of secondary/external packaging.

A hot-melt adhesive mixture for the joining and collation of multiple containers for beverages or food to form a pack without the use of a shrink sleeve film, cardboard or any other secondary or external packaging.

Upon reaching the consumer the containers can be separated from each other prior to use. The adhesive on the container surface can be removed by mechanical means to aid recycling.

The formulation is containing the following substances in very preferred embodiments:

|   | CAS number | Approximate content |
|---|---|---|
| 2. C 5 hydrocarbon resins | 64742-16-1 | 33%-42% |
| 3. Oil | 8042-47-5 | 16%-21% |
| 4. Styrene co-polymer rubbers (preferably SEBS rubbers) | 66070-58-4 | 34%-41% |
| 5. Antioxidant | 6683-19-8 | 1% |

EXAMPLE

| Typical SBS/SIS removable adhesive | Parts by Weight % | Typical SEBS removable adhesive | Parts by Weight % |
|---|---|---|---|
| SIS Block-copolymer 15% styrene/melt flow index (200° C./5 Kg) = 25 | 20 | SEBS Block-copolymer 30% styrene/melt flow index (230° C./5 Kg) = 5 | 31.4 |

-continued

| Typical SBS/SIS removable adhesive | Parts by Weight % | Typical SEBS removable adhesive | Parts by Weight % |
|---|---|---|---|
| SBS Block-copolmyer 43% styrene-block-copolymer/melt flow index (200° C./5 kg = 25 | 22.2 | DCPD Resin | 46 |
| White mineral oil | 20 | White mineral oil | 22 |
| Paraffin wax 62-68 | 5 | Micro crystalline wax | 0.5 |
| DCPD resin | 32 | Antioxidant/stabilisor package | 0.1 |
| Stabiliser package | 0.8 | | |
| Peel adhesion 180° to PET initial after 24 hrs* | 5.2N/25 mm | Peel adhesion to PET | 4.89N/25 mm |
| Loop tack initial PET after 24 hrs at 23° C. * | 6.42N/25 mm | Loop Tack | 5.4N/25 mm |
| Peel adhesion 180° PET after 28 days at 23° C. | 15N/25 mm | Peel adhesion 180° after 28 days at 23° C. | 18.4N/25 mm |
| Loop tack after 28 days at 23° C. | 13.6N/25 mm | Loop tack after 28 days at 23° C. | 16.42N/25 mm |

A hot-melt adhesive for inventive use was prepared having the above composition, in particular comprising a mixture of styrene isoprene styrene (SIS) and styrene butylene styrene (SBS) styrenic block copolymer or comprising polystyrene-block-poly(ethylene-RAN-butylene)-block-polystyrene (SEBS). The adhesive properties of the resultant mixture were determined by peel adhesion and loop tack experiments at different times. It was found that by using the above hot-melt adhesive for adhesive bonding of PET packagings, an adhesion between the packaging containers is achieved allowing easy separation of the packagings without undue damaging thereof and simultaneously appropriate connecting the packagings before separation.

All documents cited herein are incorporated in their entireties by reference.

The features disclosed in the foregoing description and/or in the claims may, both separately and in any combination thereof, be material for realizing the invention in diverse forms thereof.

The invention claimed is:

1. A pack comprising a first packaging connected to a second packaging by a hot-melt adhesive by adhesive bonding, the adhesive bonding being made by the hot-melt adhesive, and the hot-melt adhesive comprising:
   (a) 30 to 45 parts per weight of a polymer component, the polymer component comprising a styrene block copolymer, wherein the styrene block copolymer is selected from the group consisting of polystyrene-block-poly(ethylene-RAN-butylene)-block-polystyrene and a mixture of styrene-isoprene-styrene block copolymer and styrene-butylene-styrene block copolymer;
   (b) 30 to 50 parts per weight of a tackifying component, wherein the tackifying component comprises thermoplastic adhesive resin, aliphatic hydrocarbon, cycloaliphatic hydrocarbon, aromatic hydrocarbon, the respective hydrocarbon optionally being modified and/or hydrogenated, terpenes, the terpenes optionally being modified or hydrogenated, rosins, the rosins optionally being modified or hydrogenated, or mixtures thereof;
   (c) 15 to 25 parts per weight of a plasticizer component, wherein the plasticizer component comprises paraffinic oils, naphthenic oils, polybutene, polybutadiene dibasic esters, polyols or mixtures thereof; and
   (d) 0.02 to 1.2 parts per weight of a light stabilizer, wherein the hot-melt adhesive has a density of between 0.790 and 1.2 g/cm$^3$, a melt flow index of from 15 to 4000 g/min (1 kg at 200° C.), a viscosity of between 200 and 11,000 cPs at 160° C., measured by using a Brookfield RVT viscometer, spindle SC-4-27, according to ASTM D3236 (1999), a Shore hardness in the range of from 15 to 70 A at 23° C. according to ASTM D2240, and a softening point above 40° C. and not greater than 158° C. determined by ASTM E28, and wherein the hot-melt adhesive has an adhesion of 15N/25 mm or less, determined by peel adhesion (180°) or loop tack (23° C.) methods.

2. A pack comprising at least two packagings and a hot-melt adhesive, wherein each packaging of the at least two packagings is connected to at least one other packaging of the at least two packagings by adhesive bonding, the adhesive bonding being made by the hot-melt adhesive, and the hot-melt adhesive comprising:
   (a) 30 to 45 parts per weight of a polymer component, the polymer component comprising a styrene block copolymer, wherein the styrene block copolymer is selected from the group consisting of polystyrene-block-poly(ethylene-RAN-butylene)-block-polystyrene and a mixture of styrene-isoprene-styrene block copolymer and styrene-butylene-styrene block copolymer;
   (b) 30 to 50 parts per weight of a tackifying component, wherein the tackifying component comprises thermoplastic adhesive resin, aliphatic hydrocarbon, cycloaliphatic hydrocarbon, aromatic hydrocarbon, the respective hydrocarbon optionally being modified and/or hydrogenated, terpenes, the terpenes optionally being modified or hydrogenated, rosins, the rosins optionally being modified or hydrogenated, or mixtures thereof;
   (c) 15 to 25 parts per weight of a plasticizer component, wherein the plasticizer component comprises paraffinic oils, naphthenic oils, polybutene, polybutadiene dibasic esters, polyols or mixtures thereof; and
   (d) 0.02 to 1.2 parts per weight of a light stabilizer, wherein the hot-melt adhesive has a density of between 0.790 and 1.2 g/cm$^3$, a melt flow index of from 15 to 4000 g/min (1 kg at 200° C.), a viscosity of between 200 and 11,000 cPs at 160° C., measured by using a Brookfield RVT viscometer, spindle SC-4-27, according to ASTM D3236 (1999), a Shore hardness in the range of from 15 to 70 A at 23° C. according to ASTM D2240, and a softening point above 40° C. and not greater than 158° C. determined by ASTM E28, wherein the hot-melt adhesive has an adhesion of 15N/25 mm or less, determined by peel adhesion (180°) or loop tack (23° C.) methods.

3. The pack, according to claim 2, wherein each packaging of the at least two packagings is a foodstuff packaging.

4. The pack according to claim 2, wherein one of the at least two packagings is a foodstuff container.

5. The pack according to claim 2, wherein one of the at least two packagings is selected from the group consisting of a bottle and a can.

6. The pack according to claim 5, wherein the one of the at least two packagings is a plastic bottle.

7. A method of adhesive bonding of at least a first packaging and a second packaging using a hot-melt adhesive, the method comprising
   first applying the hot-melt adhesive to one of either the first packaging or the second packaging, the hot-melt adhesive comprising:
   (a) 30 to 45 parts per weight of a polymer component, the polymer component comprising a styrene block copolymer, wherein the styrene block copolymer is selected from the group consisting of polystyrene-block-poly(ethylene-RAN-butylene)-block-polystyrene and a mixture of styrene-isoprene-styrene block copolymer and styrene-butylene-styrene block copolymer;
   (b) 30 to 50 parts per weight of a tackifying component, wherein the tackifying component comprises thermoplastic adhesive resin, aliphatic hydrocarbon, cycloaliphatic hydrocarbon, aromatic hydrocarbon, the respective hydrocarbon optionally being modified and/or hydrogenated, terpenes, the terpenes optionally being modified or hydrogenated, rosins, the rosins optionally being modified or hydrogenated, or mixtures thereof;
   (c) 15 to 25 parts per weight of a plasticizer component, wherein the plasticizer component comprises paraffinic oils, naphthenic oils, polybutene, polybutadiene dibasic esters, polyols or mixtures thereof; and
   (d) 0.02 to 1.2 parts per weight of a light stabilizer; and placing the other of either the first packaging or the second packaging in contact with the applied hot-melt adhesive, to thereby form a pack comprising
   the first packaging connected to the second packaging by the hot-melt adhesive by adhesive bonding, the adhesive bonding being made by the hot-melt adhesive,
   wherein the hot-melt adhesive has a density of between 0.790 and 1.2 g/cm$^3$, a melt flow index of from 15 to 4000 g/min (1 kg at 200° C.), a viscosity of between 200 and 11,000 cPs at 160° C., measured by using a Brookfield RVT viscometer, spindle SC-4-27, according to ASTM D3236 (1999), a Shore hardness in the range of from 15 to 70 A at 23° C. according to ASTM D2240, and a softening point above 40° C. and not greater than 158° C. determined by ASTM E28, and
   wherein the hot-melt adhesive has an adhesion of 15N/25 mm or less, determined by peel adhesion (180°) or loop tack (23° C.) methods.

8. The method according to claim 7, wherein the first packaging and the second packaging are foodstuff packagings.

9. The method according to claim 8, wherein the foodstuff packagings are foodstuff containers.

10. The method according to claim 8, wherein the foodstuff packagings are selected from the group consisting of a bottle and a can.

11. The method according to claim 10, wherein the foodstuff a packagings are plastic bottles.

12. The method according to claim 7, wherein the light stabilizer is selected from the group consisting of a sterically hindered phenolic antioxidant and a sterically hindered amine.

13. The method according to claim 7, wherein the light stabilizer is pentaerythritol tetrakis(3-(3,5-di-tert-butyl-4-hydroxyphenyl)propionate).

14. The method according to claim 7, wherein placing the other of either the first packaging or the second packaging in contact with the applied hot-melt adhesive provides a combination where the first packaging and the second packaging are detachably connected to each other.

* * * * *